US012561103B2

(12) United States Patent
Lambert et al.

(10) Patent No.: US 12,561,103 B2
(45) Date of Patent: Feb. 24, 2026

(54) CONTENT PRESENTATION SYSTEM

(71) Applicant: Panasonic Automotive Systems America, LLC., Peachtree City, GA (US)

(72) Inventors: David Kay Lambert, Sterling Heights, MI (US); Sachiko Kobayashi, Novi, MI (US)

(73) Assignee: Panasonic Systems Automotive, LLC., Peachtree City, GA (US)

( * ) Notice: Subject to any disclaimer, the term of this patent is extended or adjusted under 35 U.S.C. 154(b) by 566 days.

(21) Appl. No.: 17/523,006

(22) Filed: Nov. 10, 2021

(65) Prior Publication Data

US 2022/0413785 A1      Dec. 29, 2022

Related U.S. Application Data

(60) Provisional application No. 63/112,971, filed on Nov. 12, 2020.

(51) Int. Cl.

| | |
|---|---|
| *G06F 3/14* | (2006.01) |
| *B60K 35/10* | (2024.01) |
| *B60K 35/22* | (2024.01) |
| *B60K 35/28* | (2024.01) |
| *B60K 35/60* | (2024.01) |
| *G01S 19/01* | (2010.01) |
| *G06F 3/01* | (2006.01) |
| *G06F 16/738* | (2019.01) |

(Continued)

(52) U.S. Cl.
CPC ................ *G06F 3/14* (2013.01); *B60K 35/10* (2024.01); *B60K 35/22* (2024.01); *B60K 35/28* (2024.01); *B60K 35/60* (2024.01); *G01S 19/01*

(2013.01); *G06F 3/011* (2013.01); *G06F 16/738* (2019.01); *G06F 16/783* (2019.01); *G06V 20/59* (2022.01); *B64D 11/00151* (2014.12)

(58) Field of Classification Search
CPC .................................... G06F 3/14; G01S 19/42
USPC ......................................................... 715/719
See application file for complete search history.

(56) References Cited

U.S. PATENT DOCUMENTS

| | | | |
|---|---|---|---|
| 2019/0120967 A1 * | 4/2019 | Smits ................. | G01C 21/3626 |
| 2019/0156150 A1 * | 5/2019 | Krishnan ............... | G06V 40/18 |

(Continued)

FOREIGN PATENT DOCUMENTS

| | | | | |
|---|---|---|---|---|
| EP | 2617186 B1 * | 11/2021 | ............. | G01S 19/42 |

*Primary Examiner* — Ruay Ho
(74) *Attorney, Agent, or Firm* — Laurence S. Roach, Esq.

(57) ABSTRACT

An infotainment system for a motor vehicle includes a display screen positioned to be visible by a passenger of the motor vehicle. A storage arrangement stores a collection of video segments to be presented on the display screen. The storage arrangement also stores metadata in association with the video segments. A user interface receives inputs from the passenger. A sensor detects a characteristic of the passenger. A processing arrangement is communicatively coupled to each of the display screen, the collection of video segments, the user interface and the sensor. The processing arrangement selects one of the video segments to present on the display screen. The selecting of the one video segment is dependent upon inputs received from the passenger via the user interface, signals received from the sensor indicative of the characteristic of the passenger, and metadata associated with individual segments.

20 Claims, 2 Drawing Sheets

(51) Int. Cl.
     *G06F 16/783*     (2019.01)
     *G06V 20/59*      (2022.01)
     *B64D 11/00*       (2006.01)

(56)                References Cited

U.S. PATENT DOCUMENTS

2019/0162549  A1*    5/2019  Fouad  ..................... G06N 3/006
2020/0364588  A1*   11/2020  Knox  ..................... G06V 40/20
2021/0200506  A1*    7/2021  Winton  ................. A61M 21/02

* cited by examiner

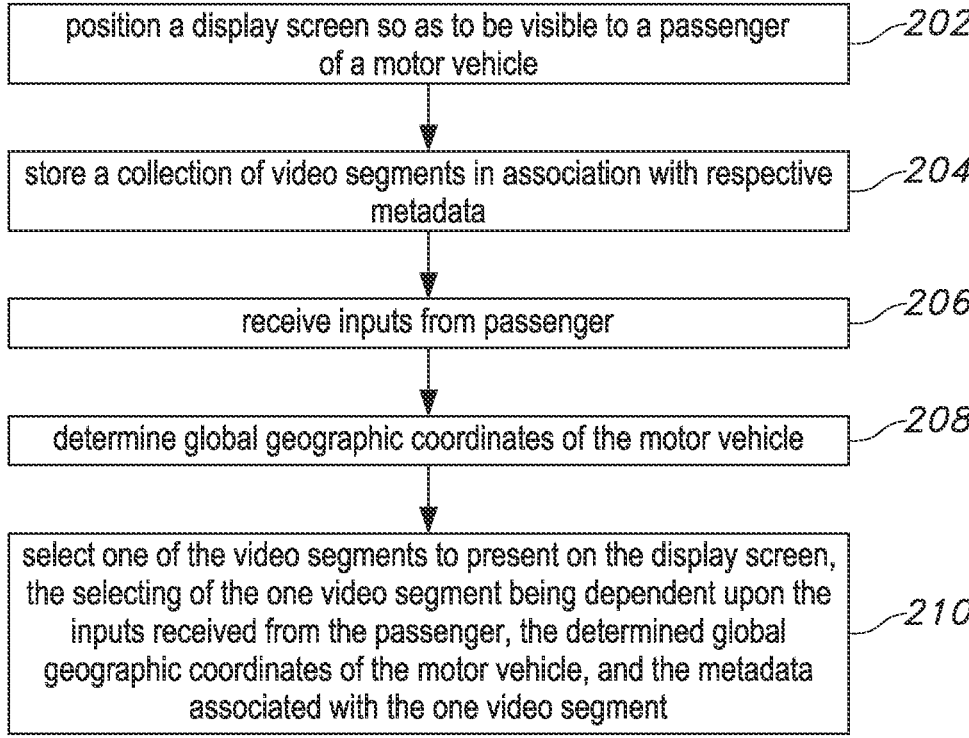

position a display screen so as to be visible to a passenger of a motor vehicle ~202 store a collection of video segments in association with respective metadata ~204 receive inputs from passenger ~206 determine global geographic coordinates of the motor vehicle ~208 select one of the video segments to present on the display screen, the selecting of the one video segment being dependent upon the inputs received from the passenger, the determined global geographic coordinates of the motor vehicle, and the metadata associated with the one video segment ~210

CONTENT PRESENTATION SYSTEM

CROSS-REFERENCED TO RELATED APPLICATIONS

This application claims benefit of U.S. Provisional Application No. 63/112,971, filed on Nov. 12, 2020, the disclosure of which is hereby incorporated by reference in its entirety for all purposes.

BACKGROUND OF THE INVENTION

1. Field of the Invention

The present invention relates to an entertainment system, and, more particularly, to an entertainment system in a motor vehicle.

2. Description of the Related Art

Automotive rear-seat entertainment systems that play pre-recorded videos for children in the rear seat are well known. General purpose virtual assistants such as Amazon Alexa, Apple Siri, Google Assistant, Microsoft Cortana and IBM Watson have already been implemented in vehicles. Media providers such as YouTube and Netflix use machine learning and artificial intelligence to suggest content that a user is likely to enjoy based on their past choices.

Other existing entertainment, information or communication products include augmented reality apps and games for cell phones such as Google Translate, Pokémon GO, ARrrrgh, etc.; computer games and board games implemented on a computer; vehicle navigation systems that provide information about points of interest to the driver; person-to-person communication systems such as talking on a cell phone or interacting via Skype; and music playing systems, such as the iPod, that are able to randomly play selections from the pre-recorded content on a device.

Samsung has announced a product they described as the NEON "artificial human." Information provided by Samsung suggests NEON is intended to interact with an adult user. It is a video chatbot that can learn people's preferences and respond to their queries in an unusually lifelike way. Samsung hopes that companies and people will license Neons, and says they can be used as yoga instructors, TV anchors, spokespeople, movie actors, financial advisors and more.

SUMMARY OF THE INVENTION

The invention may enable a person (especially a child) to use their imagination and safely interact with a collection of pre-recorded content in a non-sequential order. An associated application program uses the human machine interface (HMI) in a vehicle to create a user interface that the user perceives as interacting with a virtual person. The experience may enhance learning, creativity, and user enjoyment. Past HMI input by the user is one form of user input to the system. Metadata associated with the content is another input. In one embodiment, sensors that passively monitor the user, as well as exterior sensors, cloud data, and Internet of things (IoT) data provide input to the system. IoT data may include data from smart home and devices, such as smartphones and tablets, which may have user profiles and usage information.

This invention can be implemented in a land vehicle or via a seat-back entertainment system in an aircraft. For land vehicle implementation, vehicle resources such as the in-vehicle entertainment system, the audio system and displays may be used to provide an experience that a child likes and the child's parents want to encourage. The displays may provide a virtual reality experience through a goggle or augmented reality on the windows. The same inventive concept is used to meet adult needs.

Relative to such products, the current invention is different in that a collection of creative content in a defined domain is presented to a user as a personalized sequence, based on an application program, past HMI input, metadata associated with the content, and passive sensors that monitor the user. It is perceived by the user as interacting with a virtual person.

The invention may keep a child entertained on a long trip, and may provide a fun experience that is enriching and educational. The invention may enhance the safety of children by providing a positive experience in place of more dangerous alternatives.

For adults, the system may act as a tour guide. The system may help a tourist respond appropriately to a different culture and language. The system may also be entertaining for an adult.

The system may provide increased enjoyment of the infotainment system in a vehicle by adding creative content that adds structure to the experience and stirs the imagination of the user. The system may be an alternative to listening to a radio channel or playing pre-recorded content from a user's personal device. The infotainment system may use the user's past HMI inputs together with passive observations to predict a characteristic of the user such as their "mood", "current interests", or their "need for a traffic update" and use metadata to provide tailored content that meets the user's desires. The system may be configured to support the brand characteristics of a premium infotainment system.

While a touch-screen is used for HMI interactions and headphones are used for audio output to the user in one embodiment, other HMI means may be used. In other embodiments, the user interacts via gestures, mouse, joy stick, switch, knob, or similar device. In one embodiment, the user interacts via an alphanumeric keyboard. In one embodiment, the user interacts by singing or by playing a musical instrument or a music keyboard. In one embodiment, the user interacts by natural language audio as input and output to the system.

In one embodiment, the system includes a video camera to monitor the user, and recognizes the user's facial expressions, gestures and body language to decide how best to interact. Embodiments in which the system uses other passive inputs to tailor the response to the user are described hereinabove.

In one embodiment, the system has the capability to identify individuals. Face recognition performed on a video image of the user is one such method known to the art. Thus, the system responds appropriately to two child siblings depending upon which child is in which seat. The system may create a profile and build a history for each occupant, and learn new behaviors, to better predict future needs and wants. The memory used to implement identification may persist when the vehicle is off. The system may maintain a memory of previous interactions with each individual in order to best interact with a particular person.

Output from the system may include a simplified image of a face on a video screen. Output from the system may include a projected image. For example, an image may be projected onto the back of the seat in front of the user.

Output from the system may include video content presented on a display screen of a headset worn by a passenger in the vehicle on his head. That is, a headset may be used to display video to a passenger in the vehicle. Augmented reality and virtual reality may be implemented through goggles. The system output may involve the use of a voice synthesizer to create realistic speech, as is known in the art. Alternative output means include text on a video screen, music, a video clip, and a projected image on an object to make the object appear to be alive, especially within the context of a child's imagination.

The system may have the capability to determine the geographical location of the vehicle, and provide content to the user based on location. The geographical location may, for example, be determined by a GPS receiver.

Other possible inputs to the system to determine how best to respond include: the time-of-day, the date, the ambient temperature in the vehicle, the temperature outside the vehicle, the noise level in the vehicle, the illumination level in the vehicle, the identities of the occupants (e.g., who is in the car and in what seat), what is in the surrounding environment (e.g., what is around the car and on the driving path), the status of the vehicle both inside and outside, and details of the roads planned by the navigation system for the upcoming drive.

The application program may have the capability to use alternative personas: male/female, child age, language, racial and cultural characteristics, fictional personas, and other means to differentiate, personalize and customize. The user, or the adult supervising the interaction, may chose the persona.

The invention comprises, in one form thereof, an infotainment system for a motor vehicle, including a display screen positioned to be visible by a passenger of the motor vehicle. A storage arrangement stores a collection of video segments to be presented on the display screen. The storage arrangement also stores metadata in association with the video segments. A user interface receives inputs from the passenger. A sensor detects a characteristic of the passenger. A processing arrangement is communicatively coupled to each of the display screen, the collection of video segments, the user interface and the sensor. The processing arrangement selects one of the video segments to present on the display screen. The selecting of the one video segment is dependent upon inputs received from the passenger via the user interface, signals received from the sensor indicative of the characteristic of the passenger, and metadata associated with the one video segment.

The invention comprises, in another form thereof, an infotainment system for a motor vehicle, including a display screen positioned to be visible to a passenger of the motor vehicle. A storage arrangement stores a collection of video segments configured to be presented on the display screen. The storage arrangement also stores metadata in association with the video segments. A global positioning device determines global geographic coordinates of the motor vehicle. A user interface receives inputs from the passenger. A processing arrangement is communicatively coupled to each of the display screen, the collection of video segments, the user interface, and the global positioning device. The processing arrangement selects one of the video segments to present on the display screen. The selecting of the one video segment is dependent upon inputs received from the passenger via the user interface, a location of the motor vehicle as determined by the global positioning device, and metadata associated with the one video segment.

The invention comprises, in yet another form thereof, a method of operating an infotainment system in a motor vehicle, including positioning a display screen so as to be visible to a passenger of the motor vehicle. A collection of video segments is stored in association with respective metadata. Inputs from the passenger are received. Global geographic coordinates of the motor vehicle are determined. One of the video segments is selected to be presented on the display screen. The selecting of the one video segment is dependent upon the inputs received from the passenger, the determined global geographic coordinates of the motor vehicle, and the metadata associated with the one video segment.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 2 is a flow chart of one embodiment of a method of the present invention for operating an infotainment system in a motor vehicle.

DETAILED DESCRIPTION

Figure 1:
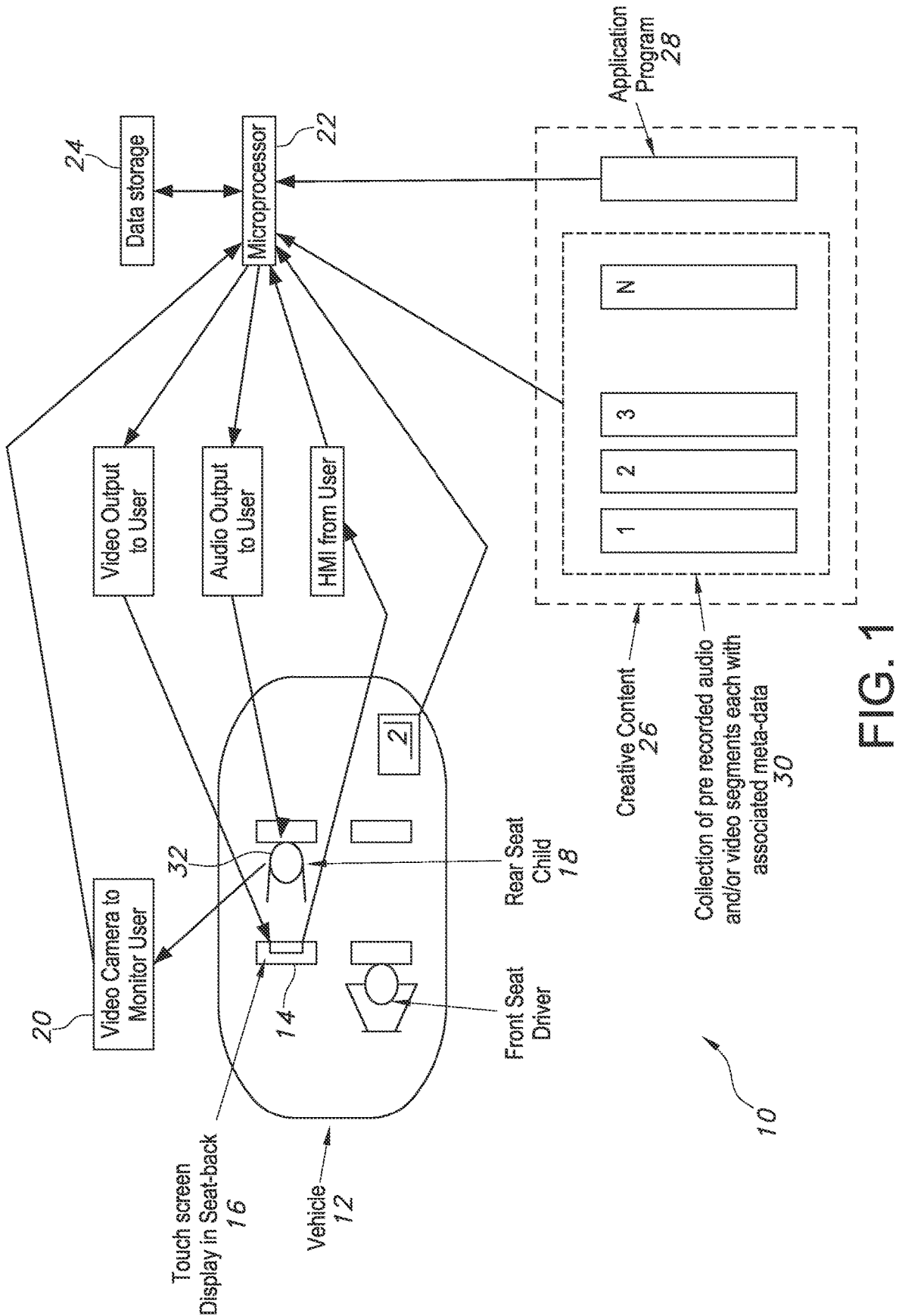
FIG. 1 is a block diagram of one embodiment of a content presentation system of the present invention.

The embodiments hereinafter disclosed are not intended to be exhaustive or limit the invention to the precise forms disclosed in the following description. Rather the embodiments are chosen and described so that others skilled in the art may utilize its teachings.

FIG. 1 illustrates one embodiment of a content presentation system 10 of the present invention, including a motor vehicle 12 having a front passenger seat 14 with a touch screen display 16 on the rear surface of seat 14. A child 18 sitting behind seat 14 may touch and interact with touch screen display 16. A video camera 20 in vehicle 12 is positioned to capture images of child 18. A global positioning system (GPS) 21 may determine global geographical coordinates of motor vehicle 12.

A microprocessor or electronic controller 22 may be in bi-directional communication with touch screen display 16, video camera 20, GPS 21, a memory or data storage device 24, and a creative content block 26. Creative content block 26 may include a memory device storing an application program 28 and a collection 30 of pre-recorded audio and/or video segments each with associated metadata. Microprocessor 22 and application program 28 may be conjunctively referred to herein as a "processing arrangement". Data storage device 24 and the memory hardware storing collection 30 may be conjunctively referred to herein as a "storage arrangement".

Any or all of microprocessor 22, data storage device 24 and creative content block 26 may be disposed within vehicle 12. Likewise, any or all of microprocessor 22, data storage device 24 and creative content block 26 may be remotely disposed outside of vehicle 12 and wirelessly accessed by a wireless communication device (not shown) within vehicle 12.

During use, microprocessor 22 receives images of child 18 captured by camera 20 and receives HMI inputs from child 18 through touch screen display 16. Microprocessor 22 also transmits video output to display 16 for viewing by child 18. Microprocessor 22 also transmits audio output to loudspeakers (not shown), ear phones (not shown) or headphones 32 through which child 18 may hear the audio output.

Child 18 interacts with touch-screen display 16 and is provided with audio. A collection of pre-recorded audio or video segments from collection 30 is presented to child 18. Each of the audio or video segments may be presented in a way that is like, or simulates, interacting with a real person. Application program 28 runs on microprocessor 22 and uses past HMI inputs from the child, metadata for each segment, and inputs from passive sensing means, such as the camera 20 monitoring the child, as inputs to application program 28. Based on these inputs, application program 28 may determine which segment to present next.

System 10 may apply to a child 18 traveling in a rear seat of vehicle 12. The hardware includes a touch screen display 16 to be viewed by child 18, HMI means to obtain input from the child (e.g., the touch screen and camera 20 for capturing images of gestures, or gaze direction), a means to provide audio to the child (such as headphones 32 or zoned audio), and application program 28. Application program 28 may use a computational system included in the vehicle hardware, such as microprocessor 22, to determine the next presented output of system 10. The choice of the presented output may be based on past inputs from the user, the intended user experience as implemented in the application program and as indicated by user inputs, and metadata associated with the pre-recorded content. The pre-recorded content may be of an actual person (such as a paid actor) and actual places, but it may also include fictional characters and places. The system may provide an experience that the user, with imagination, may perceive as real.

As one example, a 10-year-old girl living in Michigan loves Japanese culture, likes Japanese food, is learning Japanese in a class at school, and would like to visit Japan. During a long drive, she would enjoy an experience with Japanese culture. Her parents would like her to be occupied and have fun during a long drive while learning about Japanese culture, thereby supporting what she is learning in school. Her parents also want her to be safe.

Their vehicle contains means for the child to listen to audio headphones, and a rear-seat touch-screen display. A microprocessor in the infotainment system obtains HMI inputs from the child and provides audio and video to the child. The child's parents purchase or license a software package to implement the desired creative theme. In this case, the software package may include a collection of audio and video clips based on the life of a real girl in Japan, who may be of an age that is near the age of the child. The software package also includes the metadata for each clip used to implement the experience, along with an application program that runs on the microprocessor. The application program obtains HMI input from the user, provides output to the user, passively observes the user, and determines the next clip or video segment to present.

The creative content is intended to teach Japanese language and culture. The child perceives the experience as interacting with a virtual friend as they explore a virtual world.

As shown in FIG. 1, each of the audio or video clips in the collection has associated metadata that system 10 may use to help decide which item to present next. Examples of metadata include geographical location, time, subject, emotional level, physical activity level, creativity index, and so on. System 10 may use application program 28 with inputs that include the past user inputs (including both HMI inputs and passive observations of the user) together with the metadata, and the creative input of the application creator to decide the next audio or video clip to present. The system hardware that implements the algorithm may include a neural network.

In one embodiment, the experience heightens the child's use of imagination, which may help to make the experience fun for the child. For example, in one embodiment, the display shows a simplified face with lips that move while the virtual companion is talking.

The content presented may be dependent upon the age and interests of the user. In a first embodiment, the content is based on a real person and place. The user interacts with pre-recorded content so the experience is perceived (with imagination) as interacting with a virtual person in a virtual world.

In a second embodiment, the content is based on a movie or a book. Instead of being presented as a predefined sequence of audio or video segments, or chosen randomly, the creative content is presented as disconnected episodes or segments, with the choice of next episode or segment to be presented being based on an application program that uses as inputs: past user HMI, passive observations of the user, and the metadata associated with individual segments. The user perceives the creative content as interaction with a virtual persona. The algorithm that presents the content to the user gives the illusion of a self-consistent virtual world. For example, in one embodiment, the user is given options that involve moving between in different directions to adjacent locations in a virtual world. The user is given options that make sense based on their current location in the virtual world.

In a third embodiment, the driver and passengers in a vehicle interact with a collection of stored audio segments prepared by a tour guide. As a user experience, a virtual tour guide asks questions and the vehicle occupants respond via a touch screen on the center console. The system uses previous responses by the user, the vehicle location as determined from a global positioning system (GPS) or similar means, and metadata for the collection of audio clips, to determine whether an audio clip should be provided at the present time, and if so, which one. In one embodiment, the HMI presents synthesized audio that asks questions.

In a fourth embodiment, the occupants of a vehicle listen to pre-recorded music or listen to a radio channel. The metadata provides information about the available content, that an application program uses to organize the content into a virtual environment. Occasionally the user interacts with a virtual person via the HMI of the infotainment system to choose where they want to go in the virtual environment. In one embodiment the system monitors the occupants to determine a mental state of one or more occupants. The application program determines the next audio input to provide to the occupants based on inputs that include: past HMI from the occupants, passive sensor inputs that monitor the occupants, and metadata associated with the available selections. The system may also decide the volume level to provide to individual occupants, and may decide to present different audio or no audio to individual occupants.

The pre-recorded creative content may be stored within the vehicle, or may be stored remotely and accessed via wireless communications. Likewise, the computational means needed to implement the system may either be located within the vehicle or may be localized remotely and accessed via wireless communications.

The creative content may be intended for a person within a pre-specified group (male/female, range of chronological age or developmental age, native language, etc.) and may enable the person to learn about a pre-determined culture, language, or interest area. The creative content may include metadata, and the interaction is structured so the user perceives the experience as interacting with a virtual person in an actual environment.

The creative domain for the experience may use pre-existing intellectual property such as a Disney movie, a character from an action movie or cartoon, Mr. Roger's neighborhood, characters from Sesame Street, or a successful children's book.

The application program may use the location of the vehicle in which the system is implemented to help decide what content to present. For example, the presented content may include local points of interest, local culture, and local history. Embodiments include the use of pretend characters, and video that shows the real-world outside the vehicle with added characters.

The experience may involve music. In one embodiment the user is invited to sing children's songs with associated video. In another embodiment the child creates original music, perhaps with help from the system. In alternative embodiments, the child uses a keyboard or instrument to interact with the system via music.

Instead of targeting children, the experience may target adults. In one embodiment the system performs the functions of a tour guide. Pre-recorded segments are presented according to selection criteria that include past user HMI inputs, metadata associated with the individual segments, and geographical location as determined by a GPS receiver or similar means.

The system may use characteristics of the user to tailor the user experience. User characteristics considered may be static such as age, sex, and weight. These characteristics may be specified, measured or quantified through the software purchase, through interaction with the user, through a camera that monitors the user, and through other sensors in the vehicle such as a weight sensor in the seat or a sensor in the seat-belt. User characteristics considered may also be time-dependent such as heart rate, facial expression, posture, whether eyes are open or closed, and so on. Means to monitor these characteristics for vehicle occupants are known to the art. Known means include a video image of the user, output from a pressure sensor responding to a bladder in the seat cushion, a sensor that responds to deployment of the seat belt, a sensor in the seat back that monitors user posture, a sensor that monitors the force applied by driver's grip on the steering wheel, a sensor that monitor's an electric field created by the user's body, or a sensor that remotely monitors infrared absorption by the user's blood.

The system uses characteristics of the user, obtained as described above, to estimate the user's emotional state, and as a result select one of (1) the next music to listen to, (2) the next audio clip to present from a virtual tour guide, or to (3) suggest a new experience to try.

In one embodiment, the vehicle is an aircraft, and the system is implemented via the seat-back entertainment system.

Instead of being implemented in a vehicle, the system may be implemented via a cell phone, tablet, or other computer. The system may include a collection of pre-recorded creative content, and may use an application program to determine the next item in the collection to present based on past HMI inputs and the output of sensors that passively monitor the user.

Instead of presenting just pre-recorded content, the system may also provide synthesized voice output. The synthesized voice output can be HMI queries, pre-determined creative content, or both.

In another embodiment, user input includes the user's natural language voice, processed by a speech recognition system before being input to the algorithm that determines the next item to present.

FIG. 2 is a flow chart of one embodiment of a method 200 of the present invention for operating an infotainment system in a motor vehicle. In a first step 202, a display screen is positioned so as to be visible to a passenger of the motor vehicle. For example, touch screen display 16 may be on the rear surface of seat 14 such that display 16 is visible to child 18 sitting behind seat 14.

In a next step 204, a collection of video segments is stored in association with respective metadata. For example, creative content block 26 may include a memory device storing a collection 30 of pre-recorded video segments each with associated metadata.

Next, in step 206, inputs are received from the passenger. For example, microprocessor 22 may receive HMI inputs from child 18 through touch screen display 16.

In step 208, global geographic coordinates of the motor vehicle are determined. For example, global positioning system (GPS) 21 may determine global geographical coordinates of motor vehicle 12.

In a final step 210, one of the video segments is selected to present on the display screen. The selecting of the one video segment is dependent upon the inputs received from the passenger, the determined global geographic coordinates of the motor vehicle, and the metadata associated with the one video segment. For example, application program 28 runs on microprocessor 22 and may use past HMI inputs from the child, metadata for each segment, and global geographical coordinates of motor vehicle 12 from GPS 21 as inputs to application program 28. Based on these inputs, application program 28 may determine which segment to present next.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An infotainment system for a motor vehicle, comprising:

a display screen positioned to be visible by a passenger of the motor vehicle;

a storage arrangement storing a collection of video segments configured to be presented on the display screen, the storage arrangement also storing metadata in association with the video segments;

a user interface configured to receive inputs from the passenger;

a sensor configured to detect a characteristic of the passenger; and a processing arrangement communicatively coupled to each of the display screen, the collection of video segments, the user interface, and the sensor, the processing arrangement being configured to select one of the video segments to present on the display screen, the selecting of the one video segment being dependent upon:

inputs received from the passenger via the user interface;

signals received from the sensor indicative of the characteristic of the passenger; and metadata associated with the one video segment.

2. The system of claim 1 wherein the sensor is configured to detect the passenger's identity, weight, heart rate, facial expression, posture, gestures, gaze direction, or whether the passenger's eyes are open or closed.

3. The system of claim 1 wherein the inputs received from the passenger include the passenger's age, sex or gender.

4. The system of claim 1 wherein the metadata includes emotional level, physical activity level, creativity index, or a passenger age range for which the video segment is appropriate.

5. The system of claim 1 wherein the processing arrangement is configured to select a sequence of the video segments including a virtual person.

6. The system of claim 1 wherein the selecting of one of the video segments to present on the display screen is dependent upon a geographical location of the motor vehicle.

7. The system of claim 1 wherein the selecting of one of the video segments to present on the display screen is dependent upon an ambient temperature in the vehicle, a noise level in the vehicle, or an illumination level in the vehicle.

8. The system of claim 1 wherein the display screen is configured to be worn on a head of the passenger of the motor vehicle.

9. An infotainment system for a motor vehicle, comprising:

a display screen positioned to be visible to a passenger of the motor vehicle;

a storage arrangement storing a collection of video segments configured to be presented on the display screen, the storage arrangement also storing metadata in association with the video segments;

a user interface configured to receive inputs from the passenger;

a global positioning device configured to determine global geographic coordinates of the motor vehicle; and a processing arrangement communicatively coupled to each of the display screen, the collection of video segments, the user interface, and the global positioning device, the processing arrangement being configured to select one of the video segments to present on the display screen, the selecting of the one video segment being dependent upon:

inputs received from the passenger via the user interface;

a location of the motor vehicle as determined by the global positioning device; and metadata associated with the one video segment.

10. The system of claim 9 further comprising a sensor configured to detect the passenger's identity, weight, heart rate, facial expression, posture, gestures, gaze direction, and/or whether the passenger's eyes are open or closed, the processing arrangement being configured to select one of the video segments to present on the display screen dependent upon signals received from the sensor.

11. The system of claim 9 wherein the inputs received from the passenger include the passenger's age, sex or gender.

12. The system of claim 11 wherein the metadata includes a passenger age range for which the video segment is appropriate, the selecting of the one video segment being dependent upon the passenger's age and the passenger age range for which the video segment is appropriate.

13. The system of claim 9 wherein the processing arrangement is configured to select a sequence of the video segments including a virtual person.

14. The system of claim 9 wherein the selecting of one of the video segments to present on the display screen is dependent upon a point of interest nearest a geographic location of the motor vehicle as indicated by the global geographic coordinates.

15. The system of claim 9 wherein the selecting of one of the video segments to present on the display screen is dependent upon an ambient temperature in the vehicle, a noise level in the vehicle, and/or an illumination level in the vehicle.

16. A method of operating an infotainment system in a motor vehicle, the method comprising:

positioning a display screen so as to be visible to a passenger of the motor vehicle;

storing a collection of video segments in association with respective metadata;

receiving inputs from the passenger;

determining global geographic coordinates of the motor vehicle; and selecting one of the video segments to present on the display screen, the selecting of the one video segment being dependent upon:

the inputs received from the passenger;

the determined global geographic coordinates of the motor vehicle; and the metadata associated with the one video segment.

17. The method of claim 16 further comprising detecting a characteristic of the passenger, the characteristic including the passenger's identity, weight, heart rate, facial expression, posture, gestures, gaze direction, and/or whether the passenger's eyes are open or closed, the selecting of the one of the video segments to present on the display screen being dependent upon the detected characteristic.

18. The method of claim 16 wherein the metadata includes subject matter, language, geographical location, time, emotional level, physical activity level, creativity index, or a passenger age range for which the video segment is appropriate.

19. The method of claim 16 wherein the selecting of one of the video segments to present on the display screen is dependent upon a point of interest nearest a geographic location of the motor vehicle as indicated by the global geographic coordinates.

20. The method of claim 16 wherein the selecting of one of the video segments to present on the display screen is dependent upon a time-of-day, a date, an ambient temperature in the vehicle, a temperature outside the vehicle, a noise level in the vehicle, and/or an illumination level in the vehicle.

*     *     *     *     *